United States Patent [19]

Ziegler et al.

[11] Patent Number: 6,067,586
[45] Date of Patent: May 23, 2000

[54] METHOD FOR CHECKING A FIRST PROCESSOR PERFORMING FUNCTIONS BY A DATA WORD RECEIVED AND STORED, AND MODIFIED AFTER PERFORMING A GIVEN FUNCTION, AND MONITORED BY A SECOND PROCESSOR

[75] Inventors: Herbert Ziegler, Rain; Richard Merl, Schwandorf; Horst Jouvenal, Wiernsheim; Dietmar Peters, Regensburg; Johann Schmid, Cham, all of Germany

[73] Assignee: Siemens Aktiengesellschaft, Munich, Germany

[21] Appl. No.: 09/137,912

[22] Filed: Aug. 20, 1998

Related U.S. Application Data

[63] Continuation of application No. PCT/DE97/02847, Dec. 5, 1997.

[30] Foreign Application Priority Data

Dec. 20, 1996 [DE] Germany .......................... 196 53 551

[51] Int. Cl.⁷ .......................... G06F 11/22; G06F 11/277
[52] U.S. Cl. ................. 710/18; 710/19; 714/31; 714/47; 714/716; 714/750; 714/819
[58] Field of Search .................. 714/47, 701, 736, 714/735, 31–33, 819, 824, 716, 750; 710/18, 15, 19

[56] References Cited

U.S. PATENT DOCUMENTS

| Re. 31,582 | 5/1984 | Hosaka et al. | 701/102 |
| 3,920,975 | 11/1975 | Bass | 714/716 |
| 4,242,750 | 12/1980 | Finck et al. | 714/716 |
| 5,436,837 | 7/1995 | Gerstung et al. | 701/29 |
| 5,504,737 | 4/1996 | Ichii et al. | 370/242 |
| 5,504,860 | 4/1996 | George et al. | 714/11 |
| 5,581,794 | 12/1996 | Lin et al. . | |
| 5,586,117 | 12/1996 | Edem et al. | 370/466 |
| 5,673,279 | 9/1997 | Oskouy et al. | 714/819 |

FOREIGN PATENT DOCUMENTS

4114999A1 11/1992 Germany .
2153564A 8/1985 United Kingdom .

OTHER PUBLICATIONS

Dynamic Object Capability Exchange, Mar. 1996, pp. 1–2, IBM TDB, vol. 39, No. 03.

*Primary Examiner*—Thomas C. Lee
*Assistant Examiner*—Ilwoo Park
*Attorney, Agent, or Firm*—Herbert L. Lerner; Laurence A. Greenberg; Werner H. Stemer

[57] ABSTRACT

The functionality of a first processor is checked with a second processor. A data word with a specified number of data bits is supplied to the first processor from a second processor at specified time intervals. Each data bit is assigned a function. Having processed a function, the first processor inverts the associated data bit and, at the end of a time slice, passes the data word to the second processor, which checks the transferred data word.

7 Claims, 2 Drawing Sheets

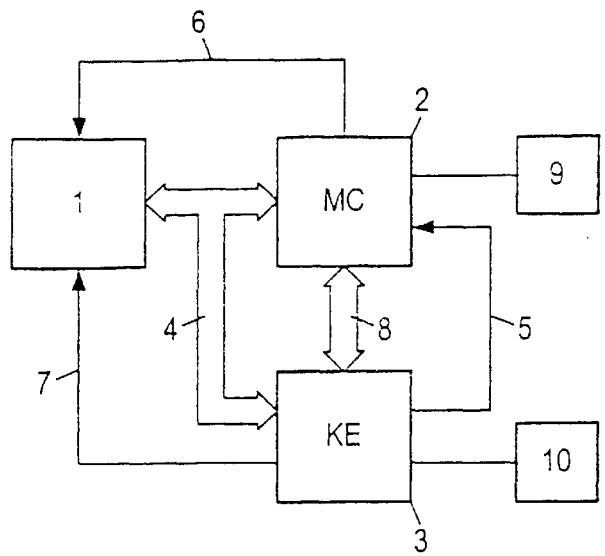
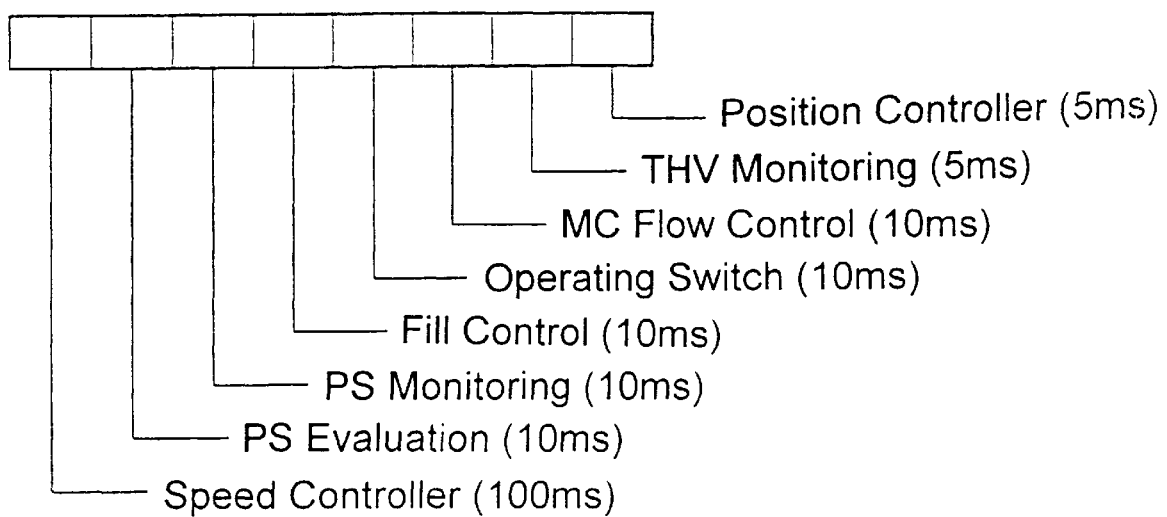

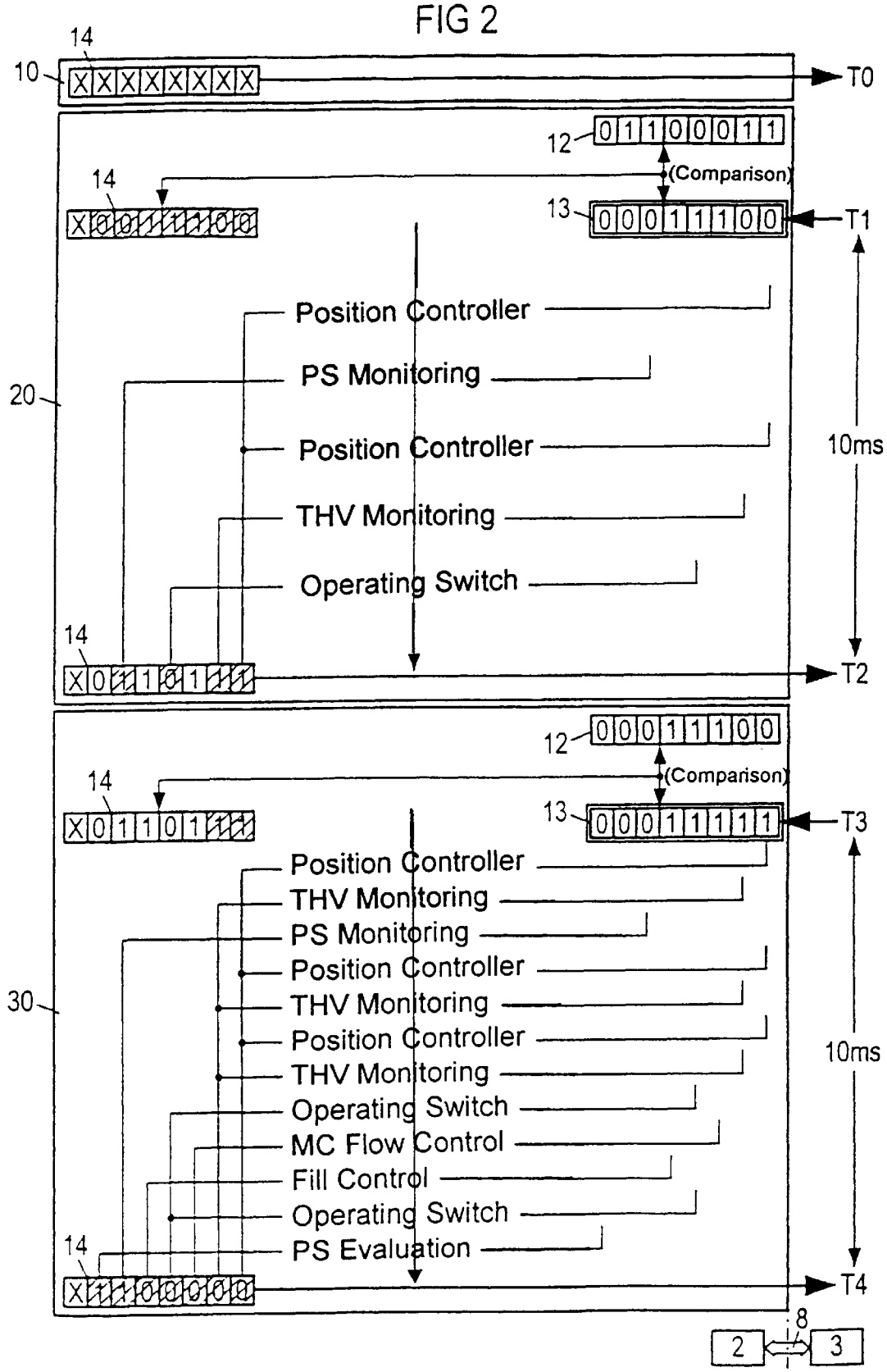

METHOD FOR CHECKING A FIRST PROCESSOR PERFORMING FUNCTIONS BY A DATA WORD RECEIVED AND STORED, AND MODIFIED AFTER PERFORMING A GIVEN FUNCTION, AND MONITORED BY A SECOND PROCESSOR

CROSS-REFERENCE TO RELATED APPLICATION

This is a continuation of copending International Application PCT/DE97/02847, filed Dec. 5, 1997, which designated the United States.

BACKGROUND OF THE INVENTION

Field of the Invention

The invention describes a method of checking the functionality of a processor. The processor thereby receives a data word from a second processor, the data word is modified by the first processor, and the second processor monitors whether the data word is modified by the first processor up to a specified instant.

Particularly in motor vehicles, safety-related functions are increasingly controlled by processors. The processors must therefore be checked for correct operation. Correct operation of the processor includes timely and punctual processing of the specified functions. Such functionality may be checked with a delay time monitor, for example.

German published non-prosecuted patent application DE 41 14 999 A1 describes a system for controlling a motor vehicle. A first processor determines the control data for a motor vehicle, and a second processor monitors the first processor. The first processor and the second processor are each connected to an independent time base. The second processor supplies the first processor with first data, which the first processor uses to calculate, on the basis of computation instructions, a result which it returns to the second processor. The second processor checks whether the data passed back by the first processor have been returned correctly and punctually.

SUMMARY OF THE INVENTION

It is accordingly an object of the invention to provide a method of checking the functionality of a processor, which overcomes the above-mentioned disadvantages of the prior art devices and methods of this general type and which is improved in monitoring the correct operation of the first processor.

With the foregoing and other objects in view there is provided, in accordance with the invention, a method of checking the functionality of a first processor, which comprises:

transmitting a data word from a second processor to a first processor;

assigning at least one bit of the data word to a given function;

modifying the data word with the first processor when the given function is processed by the first processor; and monitoring, with the second processor, whether the data word is modified by the first processor up to a specified instant.

It is a significant advantage of the invention that the processing of individual functions processed by the first processor is monitored and checked.

In accordance with an added feature of the invention, the data word is supplied with the second processor at a specified instant, the data word is compared with a reference word in the first processor, and bits that are different from corresponding bits of the reference word are written into a safeguard word. The first processor, on processing a specified function assigned to a given bit of the safeguard word, modifies the given bit of the safeguard word, and outputs the safeguard word to the second processor at a specified instant.

In accordance with an additional feature of the invention, a new data word is determined from the previous data word in the second processor and the new data word is supplied to the first processor at a specified instant, wherein the second processor modifies at least that bit in the new data word, as compared with the previous data word, a function of which is to be processed by the first processor in a specified period.

In accordance with another feature of the invention, the data word supplied by the second processor is stored by the first processor as a reference word and the reference word is subsequently compared with a next data word supplied by the second processor.

In accordance with a further feature of the invention, the data word modified in the first processor is returned to the second processor as a safeguard word, and at least one bit of the safeguard word is compared with a comparison value in the second processor.

In accordance with again a further feature of the invention, the second processor checks one bit of the safeguard word at specified time intervals that depend on the given function assigned to the one bit.

In accordance with a concomitant feature of the invention, the data word has at least one bit with a value "1" (high state) and at least one bit with a value "0" (low state).

Other features which are con side red as characteristic for the invention are set forth in the appended claims.

Although the invention is illustrated and described herein as embodied in a method of checking the functionality of a processor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a schematic block diagram of a control system of a motor vehicle;

FIG. 2 is a schematic program sequence for carrying out the method according to the invention; and FIG. 3 is a schematic of a data word for safety-related functions.

DESCRIPTION OF THE PREFERRED EMBODIMENTS

Referring now to the figures of the drawing in detail and first, particularly, to FIG. 1 thereof, there is seen a motor vehicle block 1, which is a schematic illustration of the control elements to be controlled and regulated in a motor vehicle. For example, the motor vehicle block 1 has an electronic power controller, an electronic braking system or an automatic speed controller. In addition, the motor vehicle block 1 includes the necessary sensors and pickups which detect the respective position of the corresponding actuators and control elements and the operating parameters of the motor vehicle and the environment.

The actuators and sensors in the motor vehicle block 1 are connected to a first processor 2 (MC) via a data bus 4. Preferably, the control elements and sensors in the motor vehicle block 1 are also connected to a second processor 3 (KE) via the data bus 4. The first and the second processor 2, 3 are connected to one another via a bidirectional data line 8.

Furthermore, the first processor 2 is connected to the appropriate control elements in the motor vehicle block 1 via a control line 6. The second processor 3 is connected via a control line 5 to the first processor 2, and preferably via a second control line 7 to the appropriate control elements in the motor vehicle block 1. The first processor 2 and the second processor 3 are connected to a first and second memory 9, 10, respectively.

The following text describes the configuration of FIG. 1 using the example of the electronic power control of an internal combustion engine having a throttle valve: the throttle valve is assigned a pickup which indicates the control position of the throttle valve to the first processor 2 via the data bus 4. In addition, the sensors in the motor vehicle block 1 supply the first processor 2 with information about the operating conditions of the motor vehicle. In addition, other information about external conditions such as ambient temperature, road wetness, etc., may be provided as well.

Thus, on the basis of the operating conditions of the motor vehicle in accordance with specified functions and/or tables stored in the first memory 9, the first processor 2 calculates the control position that is to be adopted by the throttle valve 1. Based on the calculation of the control position, the first processor 2 drives the actuator assigned to the throttle valve by sending a signal corresponding to the calculated control position via the control line 6.

In a simple embodiment, the second processor 3 is not connected to the data bus 4, nor does it have access to the second control line 7. In this instance, the second processor 3 checks that the first processor 2 is operating correctly by means of a data exchange via the data line 8 in accordance with a specified method which is stored in the second memory 10.

In a development of the invention, the second processor 3 is also connected to the data bus 4 and has access to the second control line 7. In this instance, the second processor 3 uses the operating conditions supplied by the sensors in the motor vehicle, and the stored functions and/or tables to calculate new control positions for certain control elements. Based on the calculation of the new control positions, the second processor 3 drives the corresponding control elements appropriately via the second control line 7. The functions and/or tables for calculating the positions of the control elements are stored in the second memory 10.

FIG. 2 shows a schematic program run which the second processor 3 uses, by means of a data exchange, to monitor the first processor 2 for correct operation, in particular for punctual processing of the specified functions. In the example, the time sequence is divided into time slices, at the beginning of which in each case the second processor 3 supplies a data word 13 to the first processor 2, and at the end of which the first processor 2 returns a safeguard word to the second processor 3. A time slice lasts for a specified duration, preferably 10 ms.

In the first time slice 10, the first processor 2 supplies a safeguard word 14, which comprises eight bits in this case, to the second processor 3 at the instant T0.

At the beginning of a second time slice 20, the second processor 3 then passes a data word 13 to the first processor 2 at the instant T1. The first processor 2 compares the data word 13 with a reference word 12 stored in the first memory 9. During the comparison, the individual bits of the data word 13 are compared with the corresponding individual bits of the reference word 12. Thus, if a bit of the data word 13 has a different value than the corresponding bit of the reference word 12, the first processor 2 writes the value of the corresponding bit of the data word into the corresponding position of a safeguard word 14, which is likewise stored in the first memory 9.

In the following text, the bit positions are denoted from right to left by the position 1 to 8. The first position of the reference word 12 has the value 1, the second position the value 1, the third position the value 0, the fourth position the value 0, the fifth position the value 0, the sixth position the value 1, the seventh position the value 1, and the eighth position the value 0.

The first position of the data word 13 has the value 0, the second position the value 0, the third position the value 1, the fourth position the value 1, the fifth position the value 1, the sixth position the value 0, the seventh position the value 0, and the eighth position likewise the value 0.

Hence, the bits of the data word 13 from the first position to the seventh position are different than the corresponding bits of the reference word 12. The first processor 2 therefore writes, into the safeguard word 14, the values of the first seven bits of the data word 13 into the corresponding first seven positions of the safeguard word 14. This is shown in FIG. 2 by hatching of the corresponding bits.

The data word 13 and the safeguard word 14 are composed in such a manner that each bit is assigned to at least one function (i.e., a particular function of the motor vehicle). In the example, the bit in the first position is assigned to position control of the throttle valve, the bit in the second position is assigned to monitoring of the throttle valve, in which case the control position of the throttle valve is compared with a permissible range, the bit in the fourth position is assigned to activation of the brake pedal, and the bit in the sixth position is assigned to pedal-sensor monitoring (PS monitoring), wherein the control position of the pedal is compared with a permissible range.

Thus, when the first processor 2 performs a function, then after the function has been carried out, that bit of the safeguard word 14 which corresponds to the function is inverted with respect to the value of the corresponding bit of the data word 13. However, it is also possible for the safeguard word 14 to be modified before the function is performed or while the function is performed. Essentially, the modified bit indicates that a specified point in the program was reached at a specified instant.

By way of example, in the second time slice 20, after the throttle-valve monitoring (THV monitoring) has been carried out, the bit situated in the second position in the safeguard word 14 is changed from the value 0 to the value 1. In the same way, after the pedal-sensor monitoring has been carried out, the bit situated in the sixth position of the safeguard word 14 is changed from the value 0 to the value 1. Similar action also takes place for the position control (position controller) and for the brake pedal (operating switch).

The first processor 2 stores the data word 13 entered in the second time range 20 as a new reference word 14 for the third time interval 30.

If the first processor 2 now performs a function twice in succession, the value of the corresponding bit in the safeguard word 14 is inverted with respect to the value of the data word 13 only on the first occasion, and on the second occasion the value which has been inverted once is retained because, after a function has been processed, the first processor 2 writes the inverted value of the corresponding bit of the data word 13 into the corresponding bit of the safeguard word 14. This is shown explicitly to the second time slice 20, using the example of the position controller.

The first processor 2 passes the safeguard word 14 which has been appropriately modified by the processing of functions to the second processor 3 at a specified instant T2 at the end of the second time slice 20. In the exemplary embodiment described, the safeguard word 14 is preferably supplied to the second processor 3·10 ms after the data word 13 has been received.

The second processor 3 now checks the bits of the safeguard word 14 using a specified table that indicates which functions are supposed to be processed by the first processor 2 at the specified instant, so that the corresponding bits have to have the inverse value of the data word 13. If the value of the corresponding bit is not inverted, a debounce counter assigned to the function of the corresponding bit is incremented by a value by the second processor 3. If the debounce counter exceeds a maximum value, then the corresponding function is recognized to be operating incorrectly.

The functions to be processed by the first processor 2 are preferably processed cyclically at various time intervals. In the example described, the position control and monitoring of the throttle valve, which correspond to the first two bits of the data word 13 and of the safeguard word 14, are carried out every 5 ms. The first two bits of the safeguard word 14 are therefore checked by the second processor 3 after each time slice, and the first two bits of the data word 13 are inverted before each time slice.

However, the first processor 2 also processes functions which are not to be carried out in each time slice. For example, PS monitoring is carried out only every 10 ms. Since a time slice is 10 ms long, there is sometimes no PS monitoring to be carried out in a time slice. In this case, for example in the first time slice 10, the second processor 2 passes the sixth bit of the data word 13 to the first processor 2 inverted with respect to the last data word 13. However, the second processor 3 does not check whether the corresponding bit of the safeguard word 14 is inverted with respect to the corresponding bit of the data word 13 until after the third time slice 30. This means that one bit of a safeguard word 14 is not checked after every time slice.

The second processor 3 preferably checks the processing of the functions, and hence the inversion of the corresponding bits of the safeguard word 14 with respect to the data word 13, at a time interval which is twice as long as the repetition rate of the processing of the functions. This prevents a small clock offset between the first and the second processor 2, 3 from causing an error to be identified even though the first processor 2 is operating correctly.

However, the time interval between the inversion of a bit in the data word 13 and the checking of the corresponding bit of the safeguard word 14 may be adapted to correspond with the functions to be processed.

The function of speed control, which corresponds to the eighth bit of the data word 13 and the eighth bit of the safeguard word 14, should be carried out every 100 ms. The eighth bit of the safeguard word 14 is therefore checked 200 ms after the inversion of the corresponding bit in the data word 13 for inversion with respect to the bit in the data word 13.

For the third time interval 30, the second processor 3 passes a new data word 13 to the first processor 2 at the instant T3. The data word 13 supplied to the first processor 2 for the second time interval 20 is used to determine the new data word 13 as follows: the bits which were checked last by the second processor 3 and whose functions ought to have been processed by the first processor 2 at this instant are inverted with respect to the old data word 13 in the new data word 13. The other bits are acquired by the data word 13 in the second time interval 20.

In the third time interval 30, the first processor 2 compares the data word 13 with the reference word 12, which corresponds to the data word 13 in the second time interval 20. The bits which are different than the reference word 12 in the data word 13 are transferred into the safeguard word 14 in the third time interval 30, which safeguard word 14 corresponds to the modified safeguard word 14 in the second time interval 20.

In the third time interval 30, the first and second bits of the data word 13 differ from those of the reference word 12. The first processor 2 therefore writes the first and second bits of the data word 13 into the safeguard word 14. This is indicated by the first and second bits of the safeguard word 14 being hatched in the third time interval 30.

In the third time interval 30, the functions of the first to the seventh bit of the safeguard word 14 are carried out by the first processor 2.

The position control corresponds to the first bit of the safeguard word 14, the monitoring of the throttle valve corresponds to the second bit, the throughput checking of the first processor corresponds to the third bit, the operating switch corresponds to the fourth bit, the filling actuator corresponds to the fifth bit, the pedal-sensor monitoring corresponds to the sixth bit, and the pedal-sensor evaluation corresponds to the seventh bit. As the first processor 2 carries out the functions of the first seven bits, the first seven bits of the safeguard word 14 are inverted by the first processor 2. This is indicated in the third time slice 30 by the first seven bits being hatched.

At the end of the third time interval 30, the modified safeguard word 14 is passed to the second processor 3 again at the instant T4. The second processor 3 then compares the bits of the safeguard word 14, which, according to the table, ought to have been processed by the first processor 2 at this instant, with the bits of the data word 13.

The process is then continued during the transition from the third time interval 30 to the fourth time interval 40, similarly to the transition from the second time interval 20 to the third time interval 30.

By virtue of the fact that the individual bits of the data word 13 and of the safeguard word 14 are inverted at regular time intervals, short circuits or incorrect maintenance of the voltage at a fixed value on the lines between the first and the second processor 2, 3 are reliably identified. This means that the line connections between the first and the second processor 2, 3 are also checked for errors.

FIG. 3 is a schematic illustration of a data word 13 for a specified number of functions which are intended to be processed regularly by the first processor 2 at the time intervals indicated in brackets; this means that the second processor 3 also checks processing at corresponding time intervals.

The bits of a data word 13 are preferably chosen such that at least one bit is provided with the value 1 and at least one bit is provided with the value 0. This makes it possible to detect a line fault, such as a short circuit occurring between the first and the second processor 2, 3 and fixing the values of all the bits at 1, i.e. a high potential, or 0, i.e. a low potential.

We claim:

1. A method of checking the functionality of a first processor, which comprises:

transmitting a data word from a second processor to a first processor;

storing the data word with the first processor;

assigning at least one bit of the data word to a given function;

modifying the data word with the first processor when the given function is processed by the first processor; and monitoring, with the second processor, whether the data word is modified by the first processor up to a specified instant.

2. The method according to claim 1, which comprises supplying the data word with the second processor at a specified instant, comparing the data word with a reference word in the first processor, and writing bits that are different from corresponding bits of the reference word into a safeguard word, the first processor, on processing a specified function assigned to a given bit of the safeguard word, modifying the given bit of the safeguard word, and outputting the safeguard word from the first processor to the second processor at a specified instant.

3. The method according to claim 1, which comprises: determining a new data word from the previous data word in the second processor and supplying the new data word to the first processor at a specified instant, wherein the second processor modifies at least that bit in the new data word, as compared with the previous data word, a function of which is to be processed by the first processor in a specified period.

4. The method according to claim 1, which comprises storing the data word supplied by the second processor with the first processor as a reference word and subsequently comparing the reference word with a next data word supplied by the second processor.

5. The method according to claim 1, which comprises returning the data word modified in the first processor to the second processor as a safeguard word, and comparing at least one bit of the safeguard word with a comparison value in the second processor.

6. The method according to claim 5, which further comprises checking with the second processor one bit of the safeguard word at specified time intervals that depend on the given function assigned to the one bit.

7. The method according to claim 1, which comprises defining the data word with at least one bit having a value "1" and at least one bit having a value "0".

* * * * *